US012271265B2

(12) United States Patent
Nam et al.

(10) Patent No.: US 12,271,265 B2
(45) Date of Patent: Apr. 8, 2025

(54) STORAGE DEVICE PROVIDING HARDWARE INITIALIZATION RETRY FUNCTION AND METHOD OF OPERATING THE SAME

(71) Applicant: Samsung Electronics Co., Ltd., Suwon-si (KR)

(72) Inventors: Suckhyun Nam, Suwon-si (KR); Taesun Park, Suwon-si (KR); Minsung Kil, Suwon-si (KR); Ho-Jin Chun, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 77 days.

(21) Appl. No.: 18/359,406

(22) Filed: Jul. 26, 2023

(65) Prior Publication Data
US 2024/0256386 A1 Aug. 1, 2024

(30) Foreign Application Priority Data

Jan. 31, 2023 (KR) ........................ 10-2023-0013176

(51) Int. Cl.
G06F 11/14 (2006.01)
G06F 1/30 (2006.01)
G06F 11/30 (2006.01)

(52) U.S. Cl.
CPC ............ *G06F 11/1417* (2013.01); *G06F 1/30* (2013.01); *G06F 11/3034* (2013.01)

(58) Field of Classification Search
CPC ............ G06F 11/1417; G06F 11/3034; G06F 11/3058; G06F 1/30; G11C 16/30
See application file for complete search history.

(56) References Cited

U.S. PATENT DOCUMENTS

| 5,283,792 | A |   | 2/1994  | Davies, Jr. et al. |
| 5,528,749 | A |   | 6/1996  | Landis et al. |
| 6,333,650 | B1| * | 12/2001 | Amin ........................ G06F 1/26 327/143 |
| 8,634,267 | B2|   | 1/2014  | Tam |
| 9,298,558 | B2|   | 3/2016  | Song |
| 9,312,693 | B2|   | 4/2016  | Huang |
| 10,665,304| B2|   | 5/2020  | Senoo et al. |

(Continued)

FOREIGN PATENT DOCUMENTS

| JP | 2003157180 A   | 5/2003 |
| JP | 2006134561 A * | 5/2006 ............. G11B 19/20 |

Primary Examiner — Yolanda L Wilson
(74) Attorney, Agent, or Firm — Harness, Dickey & Pierce, P.L.C.

(57) ABSTRACT

A storage device includes a plurality of power circuits configured to operate sequentially to drive the storage device, a control circuit configured to, monitor a plurality of first monitoring signals received from the plurality of power circuits, and generate a retry request in response to detection of hardware initialization failure in at least one of the plurality of power circuits based on the plurality of first monitoring signals, and a power sequence circuit configured to, monitor a plurality of second monitoring signals received from the plurality of power circuits and the control circuit, and retry a hardware initialization operation for at least one power circuit of the plurality of power circuits based on the retry request and the plurality of second monitoring signals.

20 Claims, 9 Drawing Sheets

(56) References Cited

U.S. PATENT DOCUMENTS

2010/0332863 A1\* 12/2010 Johnston ............... G06F 3/0619
                                                                               365/228
2013/0124888 A1\* 5/2013 Tanaka ................ G06F 12/0246
                                                                               713/320

\* cited by examiner

STORAGE DEVICE PROVIDING HARDWARE INITIALIZATION RETRY FUNCTION AND METHOD OF OPERATING THE SAME

CROSS-REFERENCE TO RELATED APPLICATION(S)

This U.S. non-provisional application claims the benefit of priority under 35 U.S.C. § 119 to Korean Patent Application No. 10-2023-0013176, filed on Jan. 31, 2023, in the Korean Intellectual Property Office, the disclosure of which is incorporated herein by reference in its entirety.

BACKGROUND

Various example embodiments of the inventive concepts relate to a storage device providing a hardware initialization retry function, a system including the storage device, and/or a method of operating the storage device.

A storage system may include a host and a storage device. When a power environment of the host is unstable, a hardware initialization failure may occur. According to the related art, there is no function to retry hardware initialization when the hardware initialization fails, so that a storage device enters an error mode at the time that the hardware initialization fails.

SUMMARY

Various example embodiments provide a storage device providing a hardware initialization retry function and a method of operating the same.

According to at least one example embodiment, a storage device includes a plurality of power circuits configured to operate sequentially to drive the storage device, a control circuit configured to, monitor a plurality of first monitoring signals received from the plurality of power circuits, and generate a retry request in response to detection of hardware initialization failure in at least one of the plurality of power circuits based on the plurality of first monitoring signals, and a power sequence circuit configured to, monitor a plurality of second monitoring signals received from the plurality of power circuits and the control circuit, and retry a hardware initialization operation for at least one power circuit of the plurality of power circuits based on the retry request and the plurality of second monitoring signals.

According to at least one example embodiment, a method of operating a storage device includes monitoring a plurality of first monitoring signals generated by a plurality of power circuits, generating a retry request in response to detection of hardware initialization failure in at least one of the plurality of power circuits based on the plurality of first monitoring signals, receiving a plurality of second monitoring signals generated by the plurality of power circuits and the control circuit, and performing a hardware initialization operation for the at least one power circuit based on the retry request and the plurality of second monitoring signals.

According to at least one example embodiment, a storage device includes a nonvolatile memory, a plurality of power circuits configured to operate sequentially to drive the storage device, processing circuitry connected to the nonvolatile memory and the plurality of power circuits, the processing circuitry configured to, in response to detecting failure of the hardware initialization, suspend entry into an error mode of the storage device, and retry a hardware initialization operation for at least one power circuit of the plurality of power circuits in the at least one power circuit.

BRIEF DESCRIPTION OF DRAWINGS

The above and other aspects, features, and advantages of various example embodiments of the inventive concepts will be more clearly understood from the following detailed description, taken in conjunction with the accompanying drawings.

DETAILED DESCRIPTION

Hereinafter, various example embodiments will be described with reference to the accompanying drawings.

Figure 1:
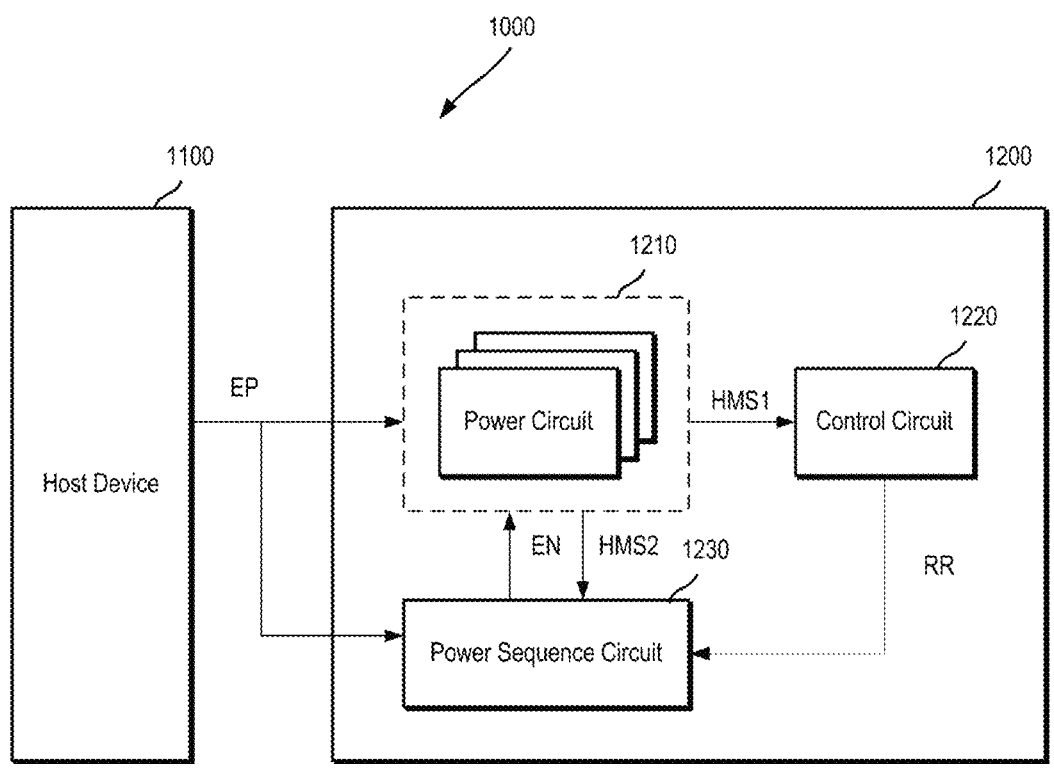
FIG. 1 is a diagram illustrating a storage system according to at least one example embodiment.

FIG. 1 is a diagram illustrating a storage system according to at least one example embodiment.

Referring to FIG. 1, a storage system 1000 according to at least one example embodiment may include at least one host device 1100 and at least one storage device 1200, etc., but the example embodiments are not limited thereto, and for example, the storage system 1000 may include a greater or lesser number of constituent elements.

The host device 1100 may control the overall operation of the storage system 1000, but is not limited thereto. The host device 1100 may communicate with the storage device 1200 through various interfaces. The host device 1100 may transmit at least one command, at least one address, and/or data to the storage device 1200 and/or may receive data from the storage device 1200, etc., but is not limited thereto.

The storage device 1200 may be accessed by the host device 1100, and may receive at least one command, at least one address, and/or data, etc., from the host device 1100 and may perform one or more operations (for example, write, read, flush, and/or the like) requested by the at least one command, but the example embodiments are not limited thereto. The storage device 1200 may read stored data based on the command and transmit the data to the host device 1100, and/or may write (e.g., store) received write data, etc.

In at least one example embodiment, the storage device 1200 may be a solid-state drive (SSD), a universal flash storage (UFS), and/or an embedded multimedia controller (eMMC), etc., but is not limited thereto. Additionally, in at least one example embodiment, the storage device 1200 may be implemented as a secure digital (SD) card, a micro SD card, a memory stick, a chip card, a universal serial bus (USB) card, a smart card, a compact flash (CF) card, and/or the like, but the example embodiments are not limited thereto.

In at least one example embodiment, the storage device 1200 may be implemented as a 3.5 inch, a 2.5 inch, a 1.8 inch, M.2, U.2, U.3, enterprise and data center SSD form factor (EDSFF), new form factor 1 (NF1), and/or a form factor similar thereto.

In at least one example embodiment, the storage device 1200 may be implemented as a small computer system interface (SATA), a small computer system interface (SCSI), a serial attached SCSI (SAS), and/or an interface similar thereto, and may be implemented as a peripheral component interconnect (PCI), PCI express (PCIe), nonvolatile memory express (NVMe), NVMe-over-Fabrics (NVMe-oF), Ethernet, InfiniBand, Fiber Channel, and/or a protocol similar thereto.

The storage device 1200 may include a plurality of power circuits 1210, at least one control circuit 1220, and at least one power sequence circuit 1230, etc., but is not limited thereto. While the example embodiments below are discussed with reference to a plurality of power circuits for the sake of brevity and clarity, the example embodiments are not limited thereto, and the storage device 1200 may include, for example, a single power circuit 1210, etc., and the detailed description would be equally applicable. According to some example embodiments, the control circuit 1220 and the at least one power sequence circuit 1230 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The plurality of power circuits 1210 may be configured to sequentially operate to drive (e.g., provide power to) the storage device 1200. For example, the plurality of power circuits 1210 may be connected to each other in series to sequentially operate, but the example embodiments are not limited thereto. Each of the plurality of power circuits 1210 may generate internal power for driving the storage device 1200, and may sequentially supply the generated internal power to a power circuit corresponding to the next stage connected to an output terminal. A single power circuit may generate internal power to be generated to a power circuit corresponding to the next state based on internal power received from a power circuit corresponding to a previous stage, etc.

In at least one example embodiment, among the plurality of power circuits, a power circuit connected to the host device 1100 may receive external power EP from the host device 1100 and may generate internal power based on the external power EP. In at least one example embodiment, among the plurality of power circuits, a power circuit connected to the control circuit 1220 may supply the generated internal power to the control circuit 1220, but the example embodiments are not limited thereto.

The control circuit 1220 may operate based on the internal power received from the power circuit, connected to the control circuit 1220, among the plurality of power circuits 1210. In at least one example embodiment, the control circuit 1220 may operate when the plurality of power circuits 1210 are sequentially and successfully turned on, but the example embodiments are not limited thereto.

The control circuit 1220 may control and/or monitor the plurality of power circuits 1210. In at least one example embodiment, the control circuit 1220 may receive a first monitoring signal HMS1 from the plurality of power circuits 1210 and/or may monitor the received first monitoring signal HMS1, etc. The first monitoring signal HMS1 may be generated and transmitted from each of the plurality of power circuits 1210 and may provide information on an operating status of each of the plurality of power circuits 1210.

The control circuit 1220 may monitor the plurality of power circuits 1210 based on the monitored first monitoring signal HMS1 and may generate a retry request RR when a hardware initialization failure is detected in at least one of the plurality of power circuits 1210, etc.

According to at least one example embodiment, the first monitoring signal HMS1 may indicate either one of a first state, indicating hardware initialization success, and a second state indicating hardware initialization failure, but the example embodiments are not limited thereto. Accordingly, when the received first monitoring signal HMS1 indicates the second state, the second circuit 1220 may immediately determine that hardware initialization has failed. However, the example embodiments are not limited thereto, and for example, the first monitoring signal HMS1 may indicate additional statuses (e.g., error codes, etc.) and/or additional information, such as information identifying which power circuit failed to initialize, etc.

For example, in the case in which a malfunction occurs in at least one of the plurality of power circuits 1210, the control circuit 1220 may determine that hardware initialization of the storage device 1200 has failed. The case, in which the malfunction occurs, may include, for example, a case in which abnormality (for example, generation of noise, or the like) is detected in an enable signal EN for enabling each of the plurality of power circuits 1210, a case in which abnormality is detected in an operation signal for operating each of the plurality of power circuits 1210, other than the enable signal, or the like. For example, the malfunction may occur when external power EP received from the host device 1100 is unstable, is interrupted, is below and/or above a desired voltage and/or a desired current, etc.

The retry request RR may request, instruct, and/or command the power sequence circuit 1230 to retry the hardware initialization, and may include information associated with the hardware initialization failure, etc. For example, the information associated with the hardware initialization failure may include various pieces of information on the first monitoring signal HMS1 indicating the second state, the plurality of power circuits 1210 indicating the second state, and/or other hardware in which the hardware initialization failure has occurred (for example, the plurality of power circuits 1210), etc., but the example embodiments are not limited thereto.

The control signal 1220 may be connected to a power sequence through a retry path. The control circuit 1220 may generate the retry request RR when the hardware initialization failure is detected, and may turn on the retry path. The control signal 1220 may transmit the retry request RR to the power sequence circuit 1230 through the retry path.

The power sequence circuit 1230 may control the overall operation of the plurality of power circuits 1210 and/or the control circuit 1220, etc.

In at least one example embodiment, the power sequence circuit 1230 may operate by receiving the external power EP, but is not limited thereto.

In at least one example embodiment, the power sequence circuit 1230 may receive a second monitoring signal HMS2 from the plurality of power circuits 1210 and/or the control circuit 1220, and/or may monitor the received second monitoring circuit HMS2, etc.

The second monitoring signal HMS2 may be generated and transmitted from each of the plurality of power circuits 1210 and/or the control circuit 1220, and may provide information on an operating status of each of the plurality of power circuits 1210 and/or the control circuit 1220, but the example embodiments are not limited thereto.

Similar to the first monitoring signal HMS1, the second monitoring signal HMS2 may include either one of a first state, indicating hardware initialization success, and a second state indicating hardware initialization failure, but the example embodiments are not limited thereto and the second monitoring signal HMS2 may include other status information, error information, identifier information, etc. Accordingly, when the received second monitoring signal HMS2 indicates the second state, the power sequence circuit 1230 may immediately determine that hardware initialization of the storage device 1200 has failed, etc.

The power sequence circuit 1230 may detect the hardware initialization failure based on the retry request RR and the second monitoring signal HMS2, and may retry the hardware initialization of the storage device 1200, etc.

In at least one example embodiment, before the control circuit 1220 starts to operate, the power sequence circuit 1230 may detect the hardware initialization failure based on the second monitoring signal HMS2 and may retry the hardware initialization, etc.

In at least one example embodiment, the power sequence circuit 1230 may receive the retry request RR, including the information associated with the hardware initialization failure, from the control circuit 1220 while requesting, instructing, and/or commanding a retry of the hardware initialization operation. When receiving the retry request RR, the power sequence circuit 1230 may compare the retry request RR and the second monitoring signal HMS2 with each other. When at least one of the retry request RR and the second monitoring signal HMS2 indicates hardware initialization failure, the power sequence circuit 1230 may retry (e.g., repeat) the hardware initialization for at least one power circuit, etc.

In at least one example embodiment, the power sequence circuit 1230 may control each of the plurality of power circuits 1210 and/or the control circuit 1220 through a plurality of enable signals EN, respectively applied to the plurality of power circuits 1210 and/or the control circuit 1220. For example, the power sequence circuit 1230 may cause a retry (e.g., repeat) of the hardware initialization for each of the plurality of power circuits 1210 and/or the control circuit 1220, but is not limited thereto. For example, retrying the hardware initialization may be an operation in which the power sequence circuit 1230 turns off and then turns on an enable single EN applied to at least one power circuit desiring and/or requiring a hardware initialization retry, which may be understood as toggling the enable signal EN, but is not limited thereto. Accordingly, the internal power of each of the hardware components (e.g., the plurality of power circuits 1210 and/or the control circuit 1220, etc.), to which the enable signal EN is applied, may also be switched in the order of a turned-on state, a turned-off state, and a turned-on state, and each of the components may perform the hardware initialization again.

When the first state is detected from the first monitoring signal HMS1 and the second monitoring signal HMS2 during retry of the hardware initialization, the power sequence circuit 1230 may determine that the hardware initialization has succeeded, and thus may stop the hardware initialization.

According to one or more of the above-described example embodiments, hardware initialization failure, which may occur due to an unstable and/or undesired power supply environment of the host device 100, may be monitored. When the hardware initialization failure is detected, initialization of hardware associated with driving of the storage device 1200 may be retried through a retry path, rather than the storage device 1200 immediately entering an error mode. Accordingly, indiscriminate entrance to the error mode, caused by a host environment and hardware initialization failure, may be decreased and/or prevented, and a normal power sequence operation may be performed through hardware initialization retry operations. In particular, the initialization retry may be individually performed on hardware in which initialization failure has been detected, so that time taken for initialization may be reduced.

Figure 2:
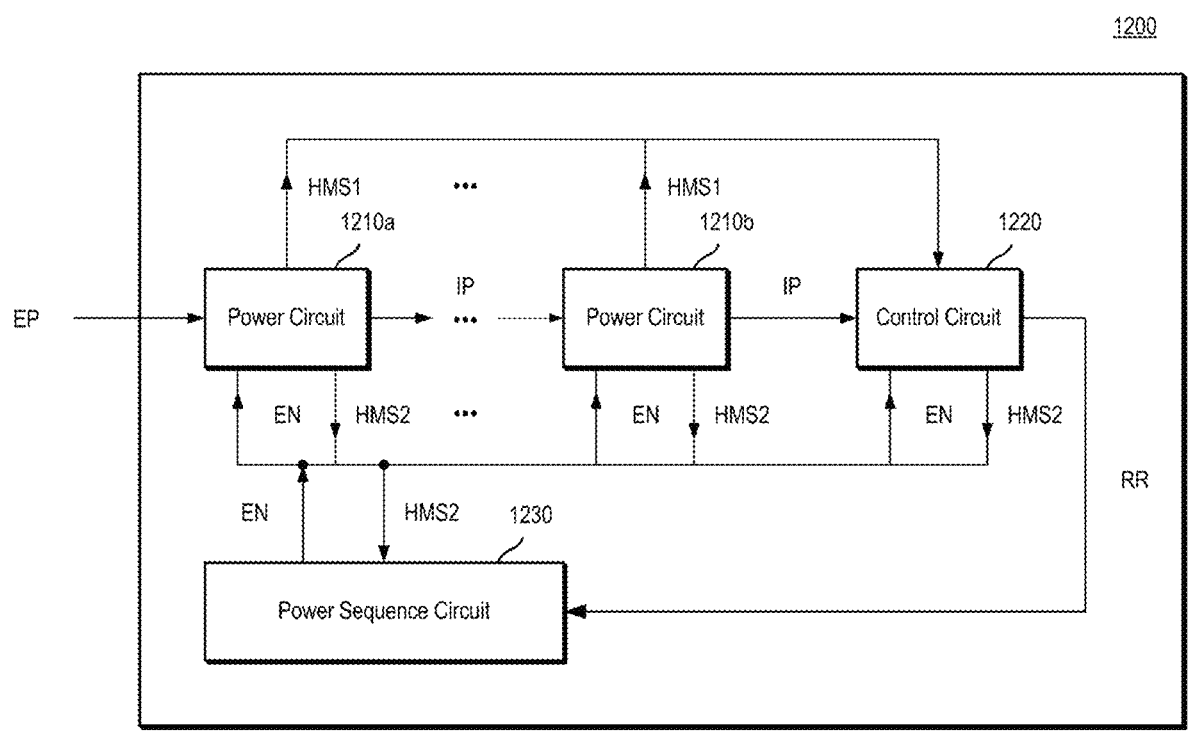
FIG. 2 is a diagram illustrating a storage device according to at least one example embodiment.

FIG. 2 is a diagram illustrating a storage device according to at least one example embodiment.

Referring to FIG. 2, the storage device 1200 according to at least one example embodiment may include the plurality of power circuits 1210a to 1210b, the control circuit 1220, and/or the power sequence circuit 1230, as described above, but the example embodiments are not limited thereto.

The plurality of power circuits 1210a to 1210b are connected to each other in order (and/or in sequence). Each of the plurality of power circuits 1210a to 1210b may generate internal power IP based on received external power EP (shown in FIG. 1) and may supply the generated internal power IP to a power circuit corresponding to the next stage connected to an output terminal. Each of the plurality of power circuits 1210a to 1210b may periodically and/or aperiodically (e.g., dynamically, etc.) transmit a plurality of first monitoring signals HMS1 to the control circuit 1220. Also, each of the plurality of power circuits 1210a to 1210b may periodically and/or aperiodically (e.g., dynamically, etc.) transmit a plurality of second monitoring signals HMS2 to the power sequence circuit 1230. Each of the plurality of first monitoring signals HMS1 and/or each of the plurality of second monitoring signals HMS2 may include status information SI corresponding to hardware components, different from each other, but the example embodiments are not limited thereto. Additionally, according to some example embodiments, either the plurality of first monitoring signals HMS1 from the plurality of power circuits 1210a to 1210b or the plurality of second monitoring signals HMS2 from the plurality of power circuits 1210a to 1210b may be omitted.

The control circuit 1220 may receive the plurality of first monitoring signals HMS1 from the plurality of power circuits 1210a to 1210b, respectively. Accordingly, the control circuit 1220 may monitor the plurality of power circuits 1210a to 1210b (e.g., individually monitor each of the plurality of power circuits 1210a to 1210b, etc.), but the example embodiments are not limited thereto. The control circuit 1220 may generate a retry request RR when a second state is detected in at least one of the received plurality of first monitoring signals HMS1 and may transmit the retry request RR to the power sequence circuit 1230.

The control circuit 1220 may periodically and/or aperiodically (e.g., dynamically, etc.) transmit the second monitoring signal HMS2 to the power sequence circuit 1230, but the example embodiments are not limited thereto.

The power sequence circuit 1230 may receive the plurality of second monitoring signals HMS2 from the plurality of power circuits 1210*a* to 1210*b* and/or the control circuit 1220, respectively. Accordingly, the power sequence circuit 1230 may monitor and/or individually monitor the plurality of power circuits 1210*a* and 1210*b* and the control circuit 1220 based on one of, or both of, the plurality of first monitoring signals HMS1 and the plurality of second monitoring signals HMS2, etc.

The power sequence circuit 1230 may apply a plurality of enable signals EN to the plurality of power circuits 1210*a* and 1210*b* and/or the control circuit 1220, respectively.

The power sequence circuit 1230 may compare the retry request RR with the plurality of second monitoring signals HMS2, and may detect hardware initialization failure in at least one of the plurality of power circuits 1210*a* and 1210*b* based on the plurality of second monitoring signals HMS2, for example, the second state. The power sequence circuit 1230 may toggle at least one enable signal EN applied to at least one power circuit in response to determining that a hardware initialization failure has been detected, among the plurality of enable signals EN, from a turned-off state to a turned-on state.

The power sequence circuit 1230 may individually apply an enable signal to each hardware component of the storage device 1200, and thus may sequentially retry hardware initialization from a single power circuit, to which power is supplied first, among at least one power circuit, but the example embodiments are not limited thereto, and for example, in other example embodiments, the power sequence circuit 1230 may apply the enable signal to two or more hardware components thereby causing a retry of the hardware initialization from two or more power circuits, etc.

According to one or more of the above-described example embodiments, in the storage device 1200, the power sequence circuit 1230 may monitor all hardware components included in the storage device 1200 through the plurality of second monitoring signal HMS2 in addition to the plurality of first monitoring signal HMS1, but the example embodiments are not limited thereto. Thus, the monitoring operation of the control circuit 1220 may be complementary. Also, the power sequence circuit 1230 may individually control at least one specific hardware component through the enable signal EN, and thus may retry initialization from at least one specific hardware component in which initialization failure has been detected.

Figure 3:
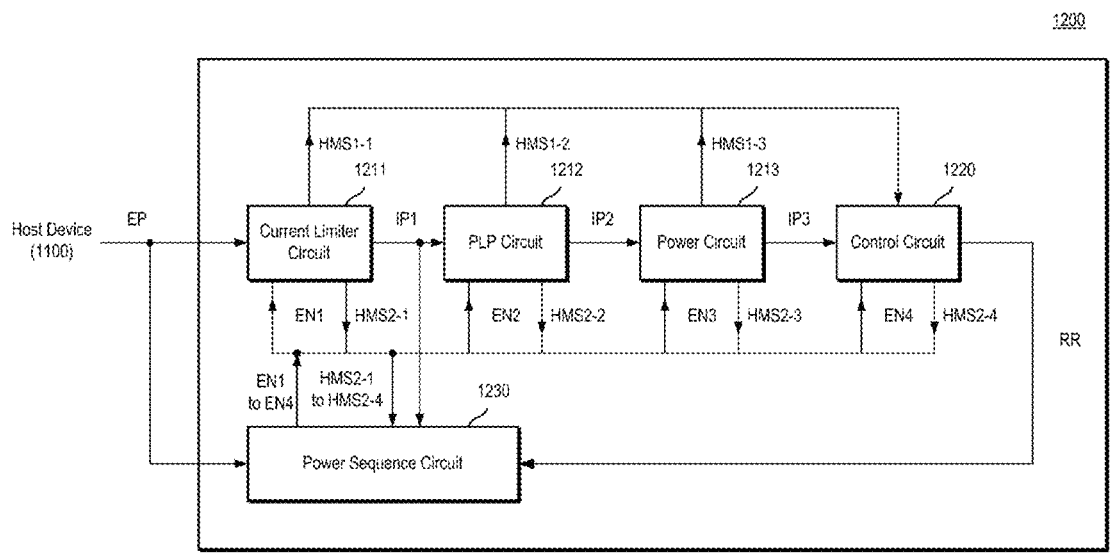
FIG. 3 is a diagram illustrating a storage device according to at least one example embodiment in more detail.

FIG. 3 is a diagram illustrating a storage device according to at least one example embodiment in more detail.

Referring to FIG. 3, the plurality of power circuits 1210 include in the storage device 1200 may include a current limiter circuit 1211, a power loss protection (PLP) circuit 1212, and/or a power circuit 1213, etc., but the example embodiments are not limited thereto.

The current limiter circuit 1211, the PLP circuit 1212, and/or the power circuit 1213 may be sequentially connected to each other, but are not limited thereto.

Figure 4:
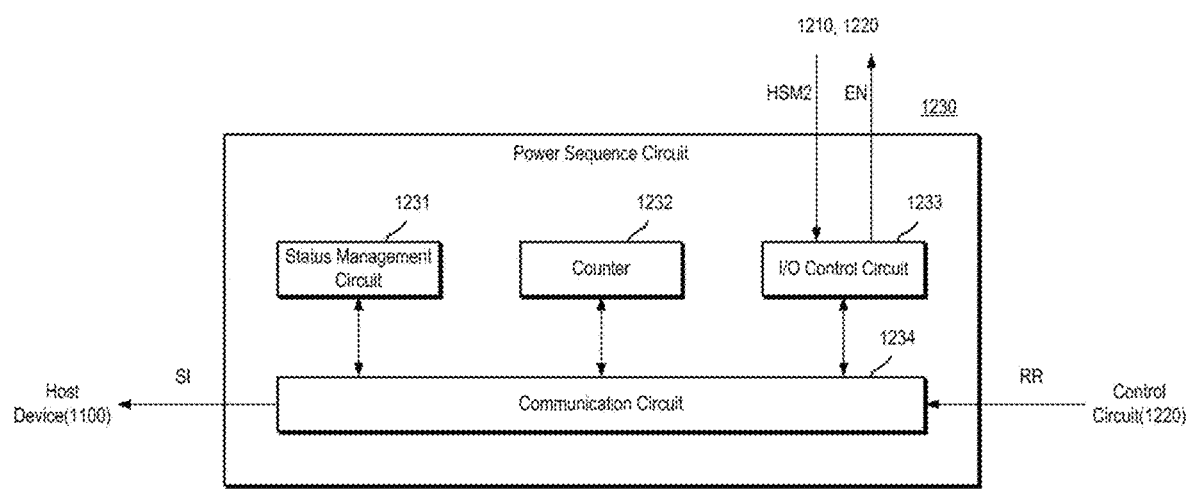
FIG. 4 is a diagram illustrating a power sequence circuit according to at least one example embodiment.

In at least one example embodiment, the current limiter circuit 1211 may be connected to the host device 1100 to receive external power EP. The current limiter circuit 1211 may generate first internal power IP1 based on the external power EP when receiving a first tenable signal EN1 from the power sequence circuit 1230, but is not limited thereto. The current limiter circuit 1211 may supply the generated first internal power IP1 to the PLP circuit 121. As shown in FIG. 4, an operating state of the current limiter circuit 1211 may be transmitted to the control circuit 1220 through a $1^{st}$ first monitoring signal HMS1-1 and/or may be transmitted to the power sequence circuit 1230 through a $1^{st}$ second monitoring signal HMS2-1.

The current limiter circuit 1211 may also perform one or more operations to adjust (e.g., increase, decrease, filter, phase-adjust, etc.) the amount of current provided from the host device 1100, etc. The current limiter circuit 1211 may be implemented as a current regulator, current filter, current phase monitor, etc., but is not limited thereto.

The PLP circuit 1212 may generate second internal power IP2 based on the received external power EP (shown in FIG. 1) and/or the received internal power IP1 received from the current limiter circuit 1211 when receiving the second enable signal EN2 from the power sequence circuit 1230, etc. The PLP circuit 1212 may supply the generated second internal power IP2 to the power circuit 1213, but is not limited thereto. An operating state of the PLP circuit 1212 may be transmitted to the control circuit 1220 through a $2^{nd}$ first monitoring signal HMS1-2, and/or may be transmitted to the power sequence circuit 1230 through a $2^{nd}$ second monitoring signal HMS2-2, etc.

The PLP circuit 1212 may perform various power loss protection operations on the storage device 1200. For example, the PLP circuit 1212 may include at least one capacitor (not shown) and/or processing circuitry (not shown), etc., wherein the PLP circuit 1212 stores received power in the at least one capacitor in case of a sudden power loss event, power disruption, and/or power interruption, etc., and is used to provide additional power to the PLP circuit 1212 so that the PLP circuit 1212 may flush data stored in volatile memory (e.g., DRAM, etc.) of the storage device 1200 (not shown) to nonvolatile memory (e.g., NAND, etc.), but the example embodiments are not limited thereto.

The power circuit 1213 may generate third internal power IP3 based on the received external power EP (shown in FIG. 1) and/or the internal power IP2 generated by the PLP circuit 1212 when receiving a third enable signal EN3 from the power sequence circuit 1230, but is not limited thereto. The power circuit 1213 may supply the generated third internal power IP3 to the control circuit 1220. An operating state of the power circuit 1213 may be transmitted to the control circuit 1220 through a $3^{rd}$ first monitoring signal HMS1-3, and/or may be transmitted to the power sequence circuit 1230 through a $3^{rd}$ second monitoring signal HMS2-3, etc.

The power circuit 1213 may perform various operations for power management of the storage device 1200, other than the operations performed by the current limiter circuit 1211 and/or the PLP circuit 1212, but the example embodiments are not limited thereto, and for example, the power circuit 1213 may also perform one or more current limiting operations and/or power loss prevention operations, etc. According to some example embodiments, the power circuit 1213 may include a DC-DC converter, an AC-DC converter, a boost circuit, a buck circuit, a boost-buck circuit, a voltage regulator, etc., but the example embodiments are not limited thereto.

The control circuit 1220 may operate by receiving the third internal power IP3 from the power circuit 1213, but is not limited thereto. For example, the control circuit 1220 may operate when an operation of the current limiter circuit

1211 based on the external power EP, an operation of the PLP circuit 1212 based on the first internal power IP1, and an operation of the power circuit 1213 based on the second internal power IP2 are sequentially performed successfully.

The control circuit 1220 may monitor the operating states of the current limiter circuit 1211, the PLP circuit 1212, and/or the power circuit 1213 through a plurality of first monitoring signals HMS1. When an abnormality is detected in the operating states of one or more of the current limiter circuit 1211, the PLP circuit 1212, and/or the power circuit 1213, for example, the plurality of first monitoring signals HMS1 indicate the second state, or the like, the control circuit 1220 may determine that hardware initialization has failed, and may generate a retry request RR based on the determination that the hardware initialization has failed, etc. The control circuit 1220 may transmit the retry request to the power sequence circuit 1230 through a retry path.

The power sequence circuit 1230 may perform a hardware initialization retry operation when hardware initialization failure has been detected by the control circuit 1220, etc.

In at least one example embodiment, the power sequence circuit 1230 may operate by receiving the external power EP from the host device 1100 and receiving the first internal power IP1 from the current limiter circuit 1211. Additionally, the power sequence circuit 1230 may operate based on one of the external power EP or the first internal power IP1.

The power sequence circuit 1230 may monitor the operating states of the current limiter circuit 1211, the PLP circuit 1212, the power circuit 1213, and/or the control circuit 1220 through a plurality of second monitoring signals, e.g., HMS2-1 to HMS2-4.

The power sequence circuit 1230 may independently control each of the current limiter circuit 1211, the PLP circuit 1212, the power circuit 1213, and/or the control circuit 1220 through the plurality of enable signals EN1 to EN4 to control a power sequence of an internal power supply of the storage device 1200, but the example embodiments are not limited thereto.

In some example embodiments, before the control circuit 1220 operates, the power sequence circuit 1230 may monitor operating states of hardware components of the storage device 1200 and may detect hardware initialization failure, based on the plurality of second monitoring signals HMS2-1 to HMS2-4, etc. When at least one of the second monitoring signals HMS2-1 to HMS2-4 indicates hardware initialization failure, the power sequence circuit 1230 may toggle the plurality of enable signals EN to independently perform an internal reset operation of each of the current limiter circuit 1211, the PLP circuit 1212, the power circuit 1213, and/or the control circuit 1220, etc. The internal reset may be defined as retrying hardware initialization for each of the hardware components included in the storage device 1200.

In some example embodiments, when the control circuit 1220 is in operation, the power sequence circuit 1230 may receive the retry request RR through a retry path. When receiving the retry request RR, the power sequence circuit 1230 may check whether the retry request RR and the plurality of second monitoring signals HMS2-1 to HMS2-4 are the same and/or are duplicates. When at least one of the retry request RR and the plurality of second monitoring signals HMS2-1 to HMS2-4 indicates hardware initialization failure, the power sequence circuit 1230 may toggle the plurality of enable signals EN to independently perform internal reset of each of the current limiter circuit 1211, the PLP circuit 1212, the power circuit 1213, and/or the control circuit 1220, etc., but is not limited thereto.

The storage device 1200 according to one or more of the above-described example embodiments may detect initialization failure through the plurality of second monitoring signals HMS2-1 to HMS2-4 before the control circuit 1220 operates, and may detect initialization failure by checking whether the retry request RR received through the retry path and the plurality of second monitoring signals HMS2-1 to HMS2-4 are duplicated when the control circuit 1220 is in operation. For example, stable hardware initialization may be ensured through the duplicate checking.

FIG. 4 is a diagram illustrating a power sequence circuit according to at least one example embodiment.

Referring to FIG. 4, the power sequence circuit 1230 according to at least one example embodiment may include a status management circuit 1231, a counter 1232, an input/output (I/O) control circuit 1233, and/or a communication circuit 1234, etc., but is not limited thereto. According to some example embodiments, the status management circuit 1231, the counter 1232, the input/output (I/O) control circuit 1233, and/or the communication circuit 1234 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The status management circuit 1231 may write a hardware initialization success status and/or a hardware initialization failure status of one or more hardware components included in the storage device 1200. For example, the status management circuit 1231 may be configured to manage statuses of the plurality of power circuits and the control circuit 1220 based on a plurality of second monitoring signals HMS2, but is not limited thereto. The hardware initialization success status and/or the hardware initialization failure status for each hardware component, written through the state management circuit 1231, may be written and stored as status information SI.

The counter 1232 may be configured to increment a value (e.g., count value) the number of times hardware initialization retry operations have been performed whenever the power sequence circuit 1230 retries hardware initialization based on an enable signal EN. For example, the count of the number of times hardware initialization retry has been performed may increase by one whenever the power sequence circuit 1230 retries the hardware initialization.

The I/O control circuit 1233 may be configured to generate, transmit, and/or apply a plurality of enable signals to each of the plurality of power circuits 1210 and the control circuit 1220, respectively, and/or to receive the plurality of second monitoring signals HMS2 from each of the plurality of power circuits 1210 and the control circuit 1220, respectively. The power sequence circuit 1230 may individually control each of the plurality of power circuits 1210 and/or the control circuit 1220 based on the application of the plurality of enable signals EN through the I/O control circuit 1233, etc. In addition, the power sequence circuit 1230 may monitor an operating state based on the plurality of second monitoring signals HMS2 received through the I/O control circuit 1233.

In at least one example embodiment, the I/O control circuit 1233 may stop, disable, and/or discontinue application of the enable signal EN when the number of times of retry exceeds a desired threshold value (e.g., a desired limit and/or a maximum number of retry operations) of the number of times of retry or is greater than or equal to the desired threshold value of the number of times of retry. The desired threshold value of the number of times of retry may be dynamically set through the power sequence circuit 1230 and/or may be a desired and/or predetermined value. Accordingly, the power sequence circuit 1230 may retry hardware initialization for at least one power circuit 1231 based on the enable signal EN until the number of retry operations is greater than or equal to the threshold value of the maximum number of times of retry. In other words, the power sequence circuit 1230 may retry hardware initialization for at least one power circuit 1231 based on the enable signal while the count of the retry operations is less than the threshold value of the number of times of retry, etc.

The communication circuit 1234 may be connected to the control circuit 1220 to form a retry path and may be configured to receive a retry request RR from the control circuit 1220, but the example embodiments are not limited thereto.

The communication circuit 1234 may be connected to the status management circuit 1231, the counter 1232, and/or the I/O control circuit 1233, etc., to transmit and/or receive various information, instructions, and/or data. For example, the communication circuit 1234 may be configured to receive the status information SI from the status management circuit 1231, to receive the number of times of retry from the counter 1232, to receive the plurality of second monitoring signals HMS2 from the I/O control circuit, and/or to transmit the enable signal EN to the I/O control circuit 1233, etc.

In at least one example embodiment, the communication circuit 1234 may be connected to the host device 1100. In this case, the communication circuit 1234 may report the status information SI, received from the status management circuit 1231, to the host device 1100, but is not limited thereto. In this case, the host device 1100 may monitor a power state of the storage device 1200 in a stage of hardware initialization, as well as in the case in which the storage device 1200 operates in a normal mode, etc.

Figure 5:
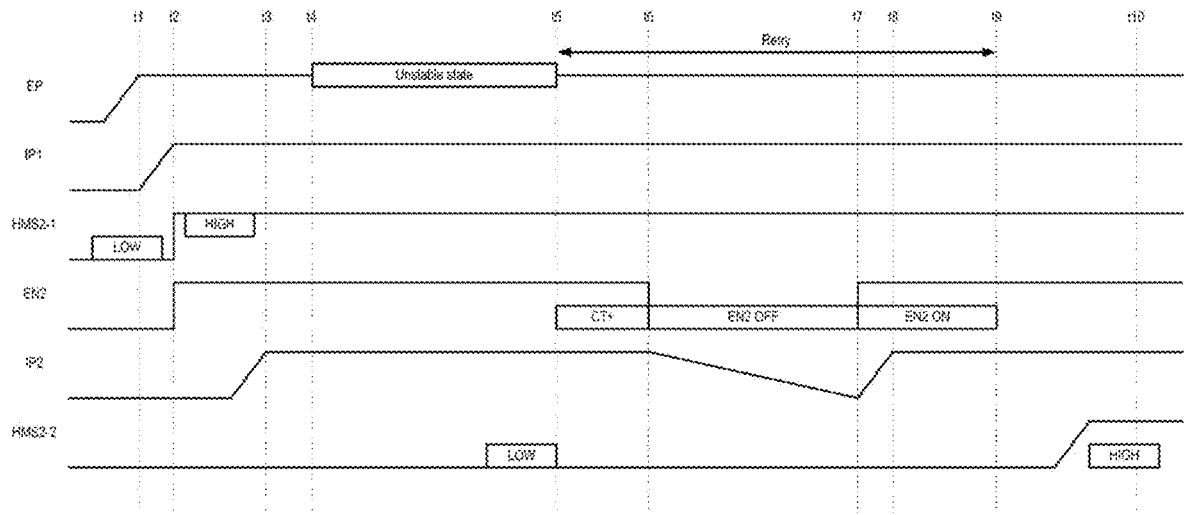
FIG. 5 is a diagram illustrating an example of an operation of a storage device according to at least one example embodiment.

FIG. 5 is a diagram illustrating an example of an operation of a storage device according to at least one example embodiment.

Referring to FIG. 5, in at least one example embodiment, the storage device 1200 may retry hardware initialization when hardware initialization failure is detected before the control circuit 1220 starts operation. FIG. 5 illustrates an example in which hardware initialization failure is detected for the PLP circuit 1212 before the control circuit 1220 operates, but the example embodiments are not limited thereto, and the hardware initialization failure may occur in a different hardware component of the storage device 1200.

At a first point in time t1, external power EP may be supplied to the storage device 1200 through the host device 1100, but the example embodiments are not limited thereto, and for example, the storage device 1200 may receive external power EP through an external power supply, a battery, etc. The current limiter circuit 1211 may generate first internal power IP1 based on the supplied external power EP, and may supply the first internal power IP1 to the PLP circuit 1212 at a second point in time t2. In this case, a 1st second monitoring signal HMS2-1 monitoring a state of the current limiter circuit 1211 may indicate a specific logic state (for example, 'HIGH') corresponding to a first state, a normal state, but is not limited thereto. For ease of description, hereinafter, a logic state of a monitoring signal will be defined as a first state when the logic state is 'HIGH' and will be defined as a second state when the logic state is 'LOW,' but the example embodiments are not limited thereto. At the second point in time t2, a second enable signal EN2 for driving the PLP circuit 1212 may be turned on by the power sequence circuit 1230 (e.g., a second enable signal with a HIGH signal may be transmitted to the PLP circuit 1212, etc.).

The PLP circuit 1212 may start operation based on the second enable signal EN2. The PLP circuit 1212 may generate second internal power IP2 based on the external power EP and/or the internal power IP1, and may supply the generated second internal power IP2 to the power circuit 1213 at a third point in time t3. At this point in time, both the current limiter circuit 1211 and the PLP circuit 1212 have been turned on by the power sequence circuit 1230, but the example embodiments are not limited thereto.

At a fourth point in time t4, the external power EP supplied by the host device 1100 may enter an unstable state as a power environment of the host device 1100 becomes unstable, but the example embodiments are not limited thereto. Accordingly, while the PLP circuit 1212 is supposed to operate normally, the hardware initialization for the PLP circuit 1212 may fail due to the unstable external power EP. For this reason, at least one $2^{nd}$ second monitoring signals HMS2-2 monitoring a state of the PLP circuit 1212 may indicate 'LOW.'

The power sequence circuit 1230 may determine whether the PLP circuit 1212 is in the second state based on the $2^{nd}$ second monitoring signal HMS2-2, and may retry the hardware initialization operation during a desired period, such as from a fifth point in time t5 to a ninth point in time t9, but the example embodiments are not limited thereto.

At the fifth point in time t5, the power sequence circuit 1230 may check the current number (and/or count) of times a hardware initialization retry operation has been performed, and may toggle (e.g., turn off and turn on) the second enable signal EN2 when the current number of times the hardware initialization retry operation has been performed is less than, or less than or equal to, a desired threshold value (e.g., desired limit) of the number of times of performing the hardware initialization retry operation. For example, when the second enable signal EN2 is turned off by the power sequence circuit 1230 at the sixth point in time t6, the PLP circuit 1212 may stop, disable, and/or discontinue the generating of the second internal power IP2, and thus the PLP circuit 1212 may identify and/or observe a decrease in the second internal power IP2. For example, when the second enable signal EN2 is turned on by the power sequence circuit 1230 at the seventh point in time t7, the PLP circuit 1212 may resume generation of the second internal power IP2, and thus the PLP circuit 1212 may identify and/or observe an increase in the second internal power IP2.

In addition, although not illustrated, the hardware initialization operation performed during the period from the fifth point in time t5 to the ninth point in time t9 may be repeatedly performed until at least one power circuit 1231 and the count of the number of performed retry operations may be incremented accordingly, in which hardware initialization failure has been detected, is restored to a normal state (for example, the first state) and/or the number of performed retry operations becomes larger than or equal to, or exceeds, the desired threshold value of the number of times of performed retry operations, but the example embodiments are not limited thereto.

When the hardware initialization state of the PLP circuit 1212 is restored to the normal state through the hardware initialization retry operation(s), the storage device 1200 may enter a normal mode. In the normal mode, the storage device 1200 may perform a desired and/or predetermined power sequence operation. Additionally, the power sequence circuit 1232 may reset and/or initialize the count of performed retry operations controlled by the counter 1232 to zero.

Figure 6:
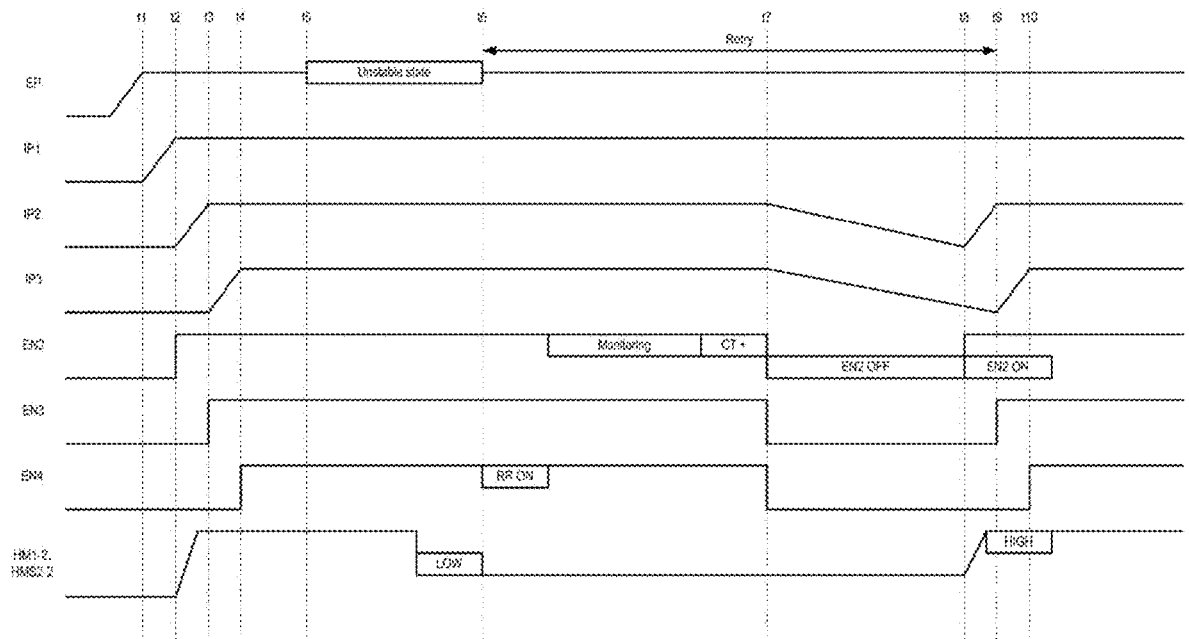
FIG. 6 is a diagram illustrating an example of an operation of a storage device according to at least one example embodiment.

FIG. 6 is a diagram illustrating an example of an operation of a storage device according to at least one example embodiment.

Referring to FIG. 6, the storage device 1200 according to at least one example embodiment may retry hardware initialization when hardware initialization failure is detected while the control circuit 1220 operates. FIG. 6 illustrates a case, in which hardware initialization failure is detected for the PLP circuit 1212 before the control circuit 1220 operates, as an example, but is not limited thereto.

At a first point in time t1, external power EP may be supplied to the storage device 1200 from the host device 1100 and/or an external power source. The current limiter circuit 1211 may generate first internal power IP1 based on the supplied external power EP, and may supply the first internal power IP1 to the PLP circuit 121 at a second point in time t2. Since the PLP circuit 1212 starts operation at the second point in time t2, a second enable signal EN2 may be turned on (e.g., turned HIGH, etc.) and/or transmitted by the power sequence circuit 1230.

The PLP circuit 1212 may start operation based on the second enable signal EN2. A 2nd first monitoring signal HMS1-2 and a 2nd second monitoring signal HMS2-2, monitoring an operating state of the PLP circuit 1212, may indicate 'HIGH,' but the example embodiments are not limited thereto. The PLP circuit 1212 may generate second internal power IP2, and may supply the second internal power IP2 to the power circuit 1213 at a third point in time t3. The power circuit 1213 may generate third internal power IP3 based on the supplied second internal power IP and/or the external power EP, and may supply the third internal power IP3 to the control circuit 1220 at a fourth point in time t4. Since the power circuit 1213 is scheduled to start operating from the third point in time t3, a third enable signal EN3 may be turned by the power sequence circuit 1230. At this point in time, the current limiter circuit 1211, the PLP circuit 1212, and the power circuit 1213 were all turned on by the power sequence circuit 1230.

At a fourth point in time t4, the control circuit 1220 may start operating by receiving the third internal power IP3 and/or the external power EP. Accordingly, a fourth enable signal EN4 may be turned on by the power sequence circuit 1230.

At a fifth point in time t5, the external power EP supplied from the host device 1100 may enter an unstable state as a power environment of the host device 1100 becomes unstable, but the example embodiments are not limited thereto. Accordingly, while the PLP circuit is supposed to operate normally, the hardware initialization operation for the PLP circuit 1212 may fail due to the unstable external power EP, etc. For this reason, at least one of the 2nd first monitoring signal HMS1-2 and the 2nd second monitoring signal HMS2-2 (or both), monitoring a state of the PLP circuit 1212, may indicate 'LOW' (e.g., hardware initialization failure, etc.).

Accordingly, the power sequence circuit 1230 may retry hardware initialization of at least the PLP circuit 1212 during a desired time period, e.g., from a sixth point in time t6 to a ninth point in time t9, etc.

The control circuit 1220 may generate and/or transmit a retry request RR to the power sequence circuit 1230 when hardware initialization failure for the PLP circuit 1212 is detected based on the 2nd first monitoring signal HMS1-2. In this case, a retry path may be turned on (e.g., instructions, data, and/or information may be transmitted over the retry path, etc.) at the sixth point in time t6. Then, the power sequence circuit 1230 may compare the retry request RR and the 2nd second monitoring signal HMS2-2 with each other. When at least one of the retry request RR and the 2nd second monitoring signal HMS2-2 indicates hardware initialization failure, the power sequence circuit 1230 may identify that the PLP circuit 1212 is in a second state (e.g., hardware initialization failure state). Then, the power sequence circuit 1230 may identify the current number of times of hardware initialization retry operations based on the count maintained by the counter 1232.

At a seventh point in time t7, the power sequence circuit 1230 may perform toggling (e.g., to turn off and turn on) of the second enable signal EN2 when the current number of hardware initialization retry operations is less than, or less than or equal to, a desired threshold value of the number of hardware initialization retry operations (e.g., a desired limit and/or a maximum number of hardware initialization retry operations, etc.). For example, when the second enable signal EN2 is turned off by the power sequence circuit 1230 at the seventh point in time t7, the PLP circuit 1212 may stop, disable, and/or discontinue generating the second internal power IP2, and thus the PLP circuit 1212 may identify and/or observe a decrease in the second internal power IP2. In addition, the power circuit 1213, operating by receiving the second internal power IP2, may stop operating, and thus the PLP circuit 1212 may identify and/or observe a decrease in the third internal power IP3.

For example, when the second enable signal EN2 is turned on again by the power sequence circuit 1230 at an eighth point in time t8, the PLP circuit 1212 may resume generation of the second internal power IP2. Accordingly, the PLP circuit 1212 may identify and/or observe an increase in the second internal power IP2 from the eighth point in time t8. After the eighth point in time t8, the 2nd first monitoring signal HMS1-2 and the $2^{nd}$ second monitoring signal HMS2-2 may switch to 'HIGH.'

As the third enable signal EN3 is turned on by the power sequence circuit 1230 from a ninth point in time t9 at which the second internal power IP2 is normalized, the power circuit may resume generation of the third internal power IP3. Therefore, the PLP circuit 1212 may identify an increase in the third internal power IP3 from the ninth point in time t9, but the example embodiments are not limited thereto.

In addition, although not illustrated, the hardware initialization performed during a desired time period from the sixth point in time t6 to the ninth point in time t9 may be repeatedly performed and the count of the number of hardware initialization retry operations is incremented accordingly until at least one of the power circuit 1231, e.g., the individual power circuit in which hardware initialization failure has been detected, is restored to a normal state (for example, the first state) and/or the number of times of retry is larger than or equal to, or exceeds, the desired threshold value of the number of times of retry (e.g., a desired limit and/or a maximum number of hardware initialization retry operations, etc.).

Finally, the control circuit 1220 may also operate normally, so that a fourth enable signal EN4 may be turned on by the power sequence circuit 1230 from a tenth point in time t10 and the count of the number of hardware initialization retry operations may be reset and/or initialized to zero.

When the hardware initialization state of the PLP circuit 1212 is restored to a normal state through the hardware initialization retry operation(s), the storage device 1200 may enter a normal mode. The storage device 1200 may perform a desired and/or predetermined power sequence operation in a normal mode.

Figure 7:
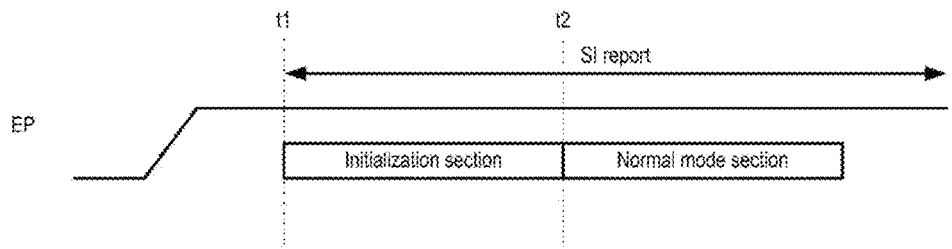
FIG. 7 is a diagram illustrating a status information reporting operation according to at least one example embodiment.

FIG. 7 is a diagram illustrating a status information reporting operation according to at least one example embodiment.

Referring to FIG. 7, the storage device 1200 may report status information SI to the host device 1100 according to various example embodiments. For example, a retry path may be formed (e.g., instructions, information, data, etc., may be transmitted) between the control circuit 1220 and the power sequence circuit 1230 included in the storage device 1200, and the power sequence circuit 1230 may also monitor the status information SI, monitored by the control circuit 1220 based on a retry request RR, etc. Additionally, the power sequence circuit 1230 may include a status management circuit 1231 which may write and/or generate the status information SI. Additionally, the power sequence circuit 1230 may include a communication circuit 1234 which may communicate with the host device 1100. For example, the power sequence circuit 1230 may report internally managed status information SI to the host device 1100, but is not limited thereto. For example, the power sequence circuit 1230 may transmit the written and stored status information SI to the host device 1100 through the status management circuit 1231, etc.

According to some example embodiments, when hardware initialization is performed from a first point in time t1 and the storage device 1200 operates in a normal mode from a second point in time t2 because the hardware initialization was successful, as illustrated in FIG. 7, the storage device 1200 may transmit the status information SI to the host device 1100 starting from the first point in time t1. For example, the communication circuit 1234 may transmit the status information SI to the host device 1100 even before hardware initialization success was detected, etc.

According to one or more of the above-described example embodiments, the status information SI may be provided to the host device 1100 in a stage in which hardware initialization was performed, as well as in a case in which the storage device 1200 operates in a normal mode. Accordingly, the status information SI may be monitored from the hardware initialization stage even from the viewpoint of the host device 1100.

Figure 8:
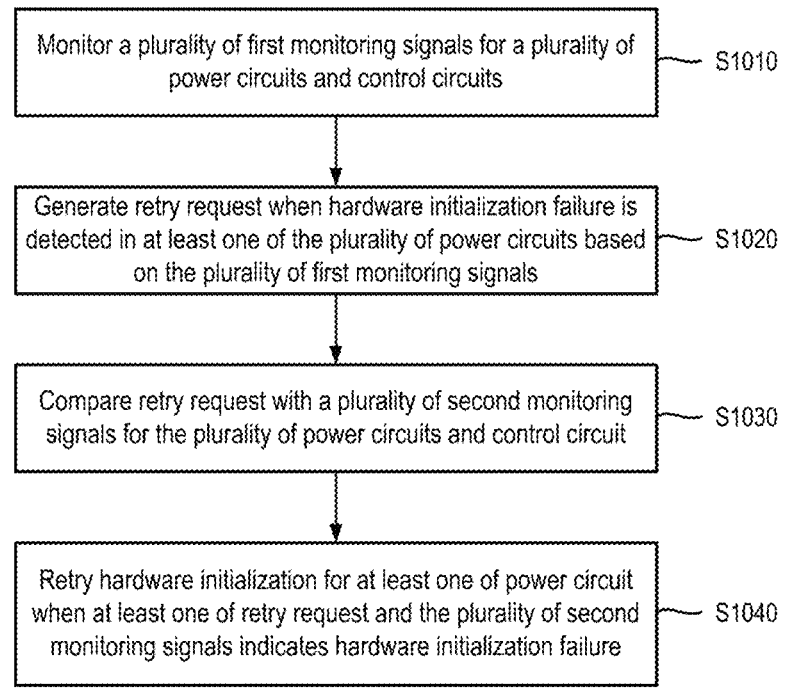
FIG. 8 is a flowchart illustrating a method of operating a storage device according to at least one example embodiment.

Referring to FIG. 8, in at least one example embodiment, in operation S1010, the storage device 1200 may monitor a plurality of first monitoring signals HMS1 for a plurality of power circuits 1210 and/or a control circuit 1220, etc., but is not limited thereto. For example, the storage device 1200 may monitor the plurality of first monitoring signals HMS1, respectively generated from the plurality of power circuits 1210 and the control circuit 1220, and may identify that at least one of the plurality of first monitoring signals HMS1 indicates a second state corresponding to hardware initialization failure of at least one component of the storage device 1200.

In operation S1020, the storage device 1200 may generate a retry request RR based on the plurality of first monitoring signals HMS1, e.g., when the hardware initialization failure is detected in at least one of the plurality of power circuits 1210, etc., but is not limited thereto.

In operation S1030, the storage device 1200 may compare the retry request RR with a plurality of second monitoring signals HMS2 for the plurality of power circuits 1210 and the control circuit 1220. For example, the retry request RR may include information associated with hardware initialization failure, such as a first monitoring signal HMS1 indicating a second state, and the storage device 1200 may compare information, associated with the hardware initialization failure included in the retry request RR, with an operating state indicated by the plurality of second monitoring signals HMS2.

In operation S1040, the storage device 1200 may retry hardware initialization for, e.g., at least one of the power circuits 1213 when a corresponding second monitoring signal HMS2 indicates hardware initialization failure, but the example embodiments are not limited thereto, and for example, all of the power circuits 1213 and/or the control circuit 1220, etc., may retry hardware initialization based on at least one of the plurality of second monitoring signal HMS2 indicating hardware initialization failure, etc. In at least one example embodiment, the storage device 1200 may count the number of times of retries performed whenever hardware initialization is performed, and may repeatedly perform operation S1040 while the number of times of retry is less than a threshold value (e.g., desired limit) of the number of times of retry, etc.

Figure 9:
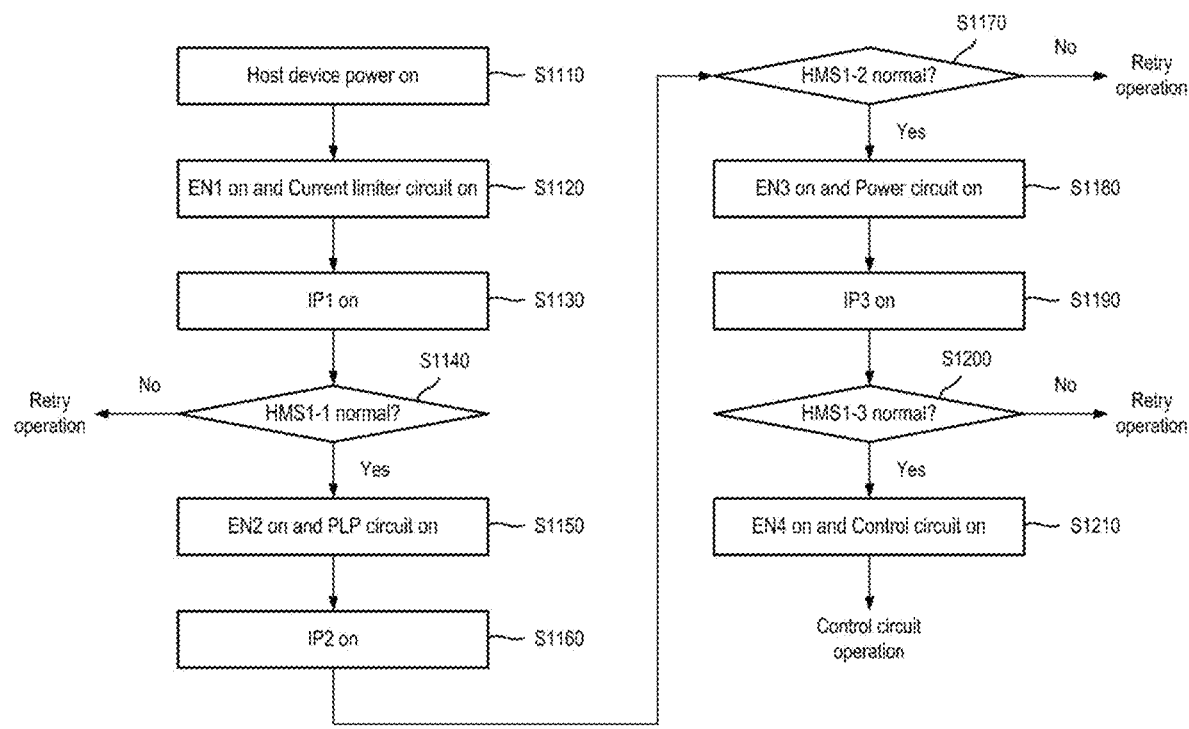
FIG. 9 is a flowchart illustrating a method of operating a storage device before operating a control circuit according to at least one example embodiment.

FIG. 9 is a flowchart illustrating a method of operating a storage device before operating a control circuit according to at least one example embodiment.

Referring to FIG. 9, in at least one example embodiment, in operation S1110, power of the host device 1100 may be turned on. Accordingly, external power EP may be supplied to the current limiter circuit 1211 included in the storage device 1200, but the example embodiments are not limited thereto.

In operation S1120, a first enable signal EN1 is turned on by the power sequence circuit 1230 and the current limiter circuit 1211 may be turned on (e.g., may begin operating) based on the first enable signal EN1.

In operation S1130, the current limiter circuit 1211 may generate first internal power IP1, and thus the first internal power IP1 may be turned on.

In operation S1140, the power sequence circuit 1230 may determine whether a 1st first monitoring signal HMS1-1 is in a first state indicating that the current limiter circuit 1211 is operating normally, while monitoring the 1st first monitoring signal HMS1-1. When the 1st first monitoring signal HMS1-1 indicates a second state (e.g., hardware initialization failure state) rather than the first state, the power sequence circuit 1230 determines that the hardware initialization of the current limiter circuit 1211 has failed, and may perform an operation of retrying hardware initialization based on the $1^{st}$ first monitoring signal HMS1-1.

When the 1st first monitoring signal HMS1-1 indicates the first state (e.g., hardware initialization success state), in operation S1150, the power sequence circuit 1230 may transmit a second enable signal EN2 (e.g., may turn on the second enable signal EN2) and the PLP circuit 1212 may be turned on (e.g., may begin operating) based on the second enable signal EN2.

In operation S1160, the PLP circuit 1212 may generate second internal power IP2, and thus the second internal power IP2 may be turned on.

In operation S1170, the power sequence circuit 1230 may determine whether a 2nd first monitoring signal HMS1-2 indicates the first state indicating that the PLP circuit 1212 is operating normally, while monitoring the 2nd first monitoring signal HMS1-2. When the 2nd first monitoring signal HMS1-2 indicates a second state rather than the first state, the power sequence circuit 1230 may perform an operation of retrying hardware initialization of at least the PLP circuit 1212, etc.

When the 2nd first monitoring signal HMS1-2 indicates the first state, in operation S1180, a third enable signal EN3 may be turned on (and/or transmitted) by the power sequence circuit 1230 and the power circuit 1213 may be turned on (and/or may begin operating) based on the third enable signal EN3.

In operation S1190, the power circuit 1213 may generate third internal power IP3, and thus the third internal power IP3 may be turned on.

In operation S1200, the power sequence circuit 1230 may determine whether a 3rd first monitoring signals HMS1-3 indicates the first state indicating that the power circuit 1213 is operating normally, while monitoring the 3rd first monitoring signal HMS1-3. When the 3rd first monitoring signal HMS1-3 indicates the second state rather than the first state, the power sequence circuit 1230 may perform an operation of retrying hardware initialization.

When the $3^{rd}$ first monitoring signal HMS1-3 indicates the first state, in operation 1210, the power sequence circuit 1230 may turn on a fourth enable signal EN4 and the control circuit 1220 may be turned on (e.g., may begin operating) based on the fourth enable signal EN4.

Figure 10:
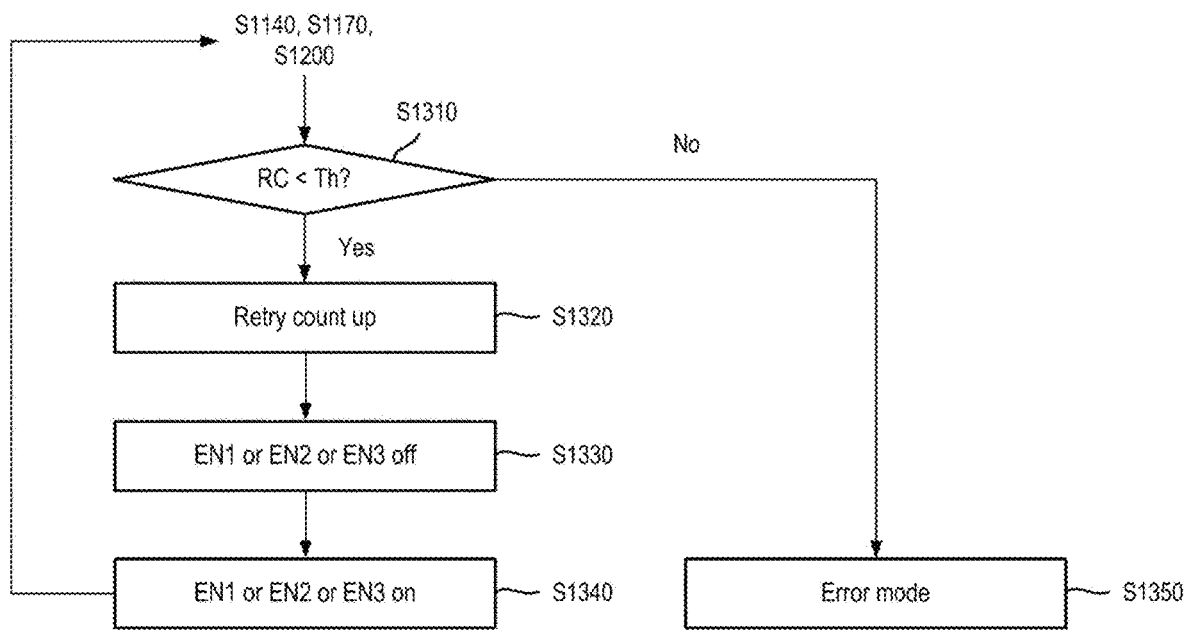
FIG. 10 is a flowchart illustrating a retry operation method according to at least one example embodiment.

FIG. 10 is a flowchart illustrating a retry operation method according to at least one example embodiment.

Referring to FIG. 10, when hardware initialization failure in at least one component of the storage device 1200 is detected in operation S1140, operation S1170, and/or operation S1200 as described above, the power sequence circuit 1230 may identify the current number (e.g., count) of times of hardware initialization retry, and may determine whether the current number of times of retry is less than a threshold value (e.g., a desired limit, etc.) of the number of times of retry.

When the current number of retries is less than the threshold value of the number of retries, the power sequence circuit 1230 may increase (e.g., increment) the count of retries and may perform the hardware initialization retry operation in operation S1320.

In operation S1330, the power sequence circuit 1230 may turn off an enable signal EN applied to at least one power circuit 1213 in which hardware initialization failure was detected, but is not limited thereto. In operation S1340, the power sequence circuit 1230 may turn on again the enable signal EN applied to at least one power circuit 1213 in which hardware initialization failure was detected, but is not limited thereto.

When the current number of times of retry is greater than or equal to the threshold number of times of retry in operation S1310, the storage device 1200 enters an error mode in operation S1350.

Figure 11:
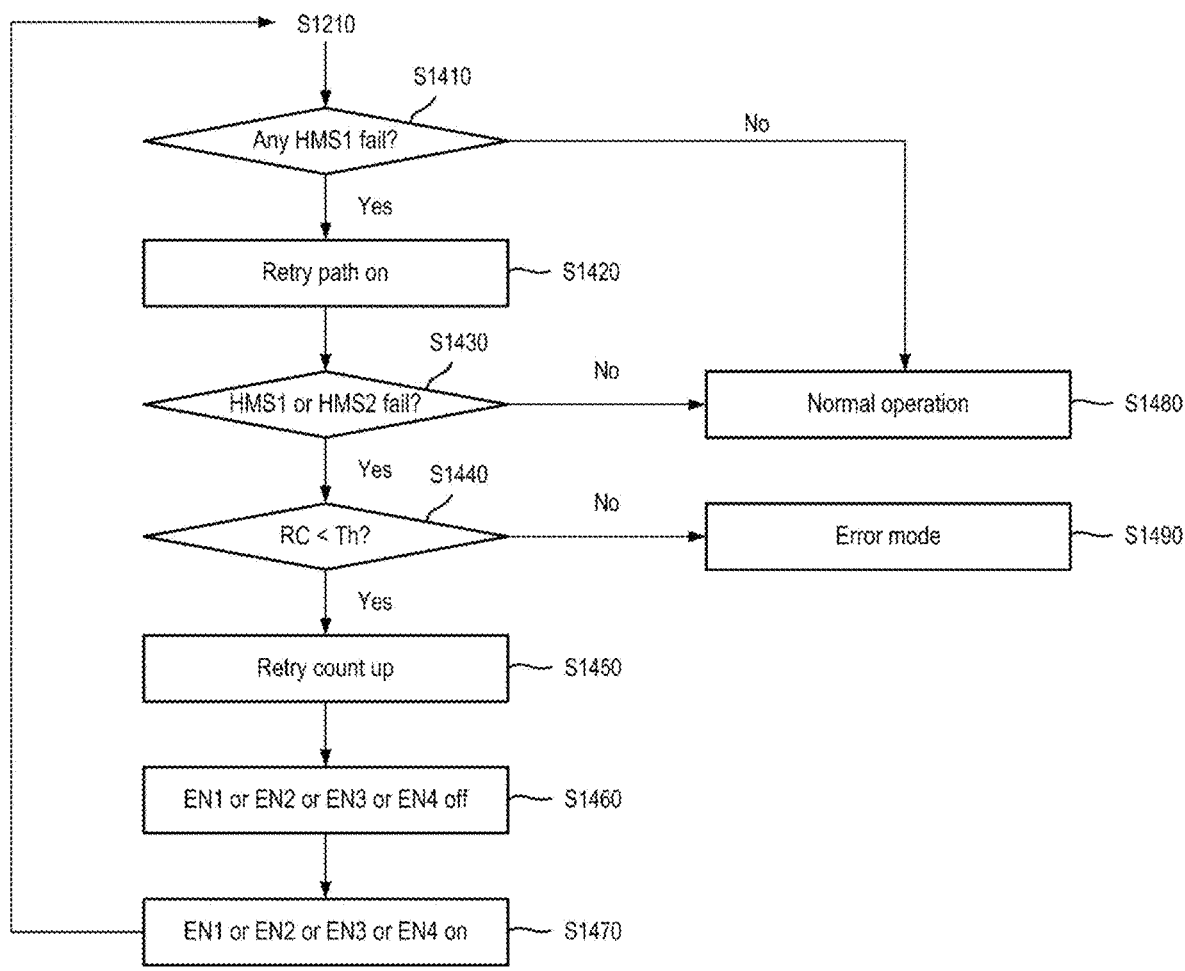
FIG. 11 is a flowchart illustrating a method of operating a storage device after operating a control circuit according to at least one example embodiment.

FIG. 11 is a flowchart illustrating a method of operating the storage device 1200 after operating a control circuit according to at least one example embodiment.

Referring to FIG. 11, the control circuit 1220 may operate as discussed in the above-described operation S1210, but the example embodiments are not limited thereto. In operation S1410, the control circuit 1220 may determine whether at least one of a plurality of first monitoring signals HMS1 indicates a second state, for example, a hardware initialization failure, based on the plurality of first monitoring signals HMS1.

When at least one first monitoring signal HMS1 indicates the second state (e.g., hardware initialization failure indication), a retry path between the control circuit 1220 and the power sequence circuit 1230 may be turned on (e.g., instructions and/or data may be communicated between the control circuit 1220 and the power sequence circuit 1230, etc.) in operation S1420.

In operation S1430, the power sequence circuit 1230 may examine, analyzed, and/or compare a retry request RR, received through the retry path, with a plurality of second monitoring signals HMS2, or in other words, the power sequence circuit 1230 may perform a logical OR operation on the retry request RR and the second monitoring signals HMS2, but is not limited thereto. For example, the retry request RR may include a first monitoring signal HMS1 indicating hardware initialization failure, and the power sequence circuit 1230 may identify whether at least one of the first monitoring signal HMS1 and the second monitoring signal HMS2 indicates hardware initialization failure.

When at least one of the first monitoring signal HMS1 and the second monitoring signal HMS2 indicates hardware initialization failure, in operation S1440, the power sequence circuit 1230 may determine the current number of times of hardware initialization retry operations and may determine whether the number of times of retry is less than a desired threshold value of the number of times of hardware initialization retry operations. In other words, the power sequence circuit 1230 may determine whether to perform an additional hardware initialization retry operation based on the first monitoring signal HMS1, the second monitoring signal HMS2, and the current count of hardware initialization retry operations.

When the number of times of retry is less than the desired threshold value of the number of times of retry, the power sequence circuit 1230 may increase (e.g., increment) the number of times hardware initialization retry operations performed in operation S1450.

In operation S1460, the power sequence circuit 1230 may perform the hardware initialization retry operation by turning off an enable signal EN applied to at least one power circuit 1213 in which hardware initialization failure was detected. In operation S1470, the power sequence circuit 1230 may continue the hardware initialization retry operation by turning on the enable signal EN applied to the at least one power circuit 1213 in which hardware initialization failure was detected. In this case, when the control circuit 1220 is in operation, the turned-on or turned-off enable signal EN may be at least one of a first enable signal EN1 to a fourth enable signal EN4, but the example embodiments are not limited thereto.

When all of the plurality of first monitoring signals HMS1 indicate a first state (e.g., normal operation status and/or hardware initialization success) in operation S1410, the storage device 1200 may operate in a normal mode in operation S1480.

When the first state indicating hardware initialization is detected from at least one of the plurality of first monitoring signals HMS1 and the plurality of second monitoring signals HMS2 in operation S1430, the storage device 1200 may stop, disable, and/or discontinue hardware initialization retry operations and operate in the normal mode in operation S1480.

When the number of times of retry is greater than or equal to the desired threshold number of times hardware initialization retry operations in operation S1440, the storage device 1200 may enter an error mode in operation S1490.

Figure 12:
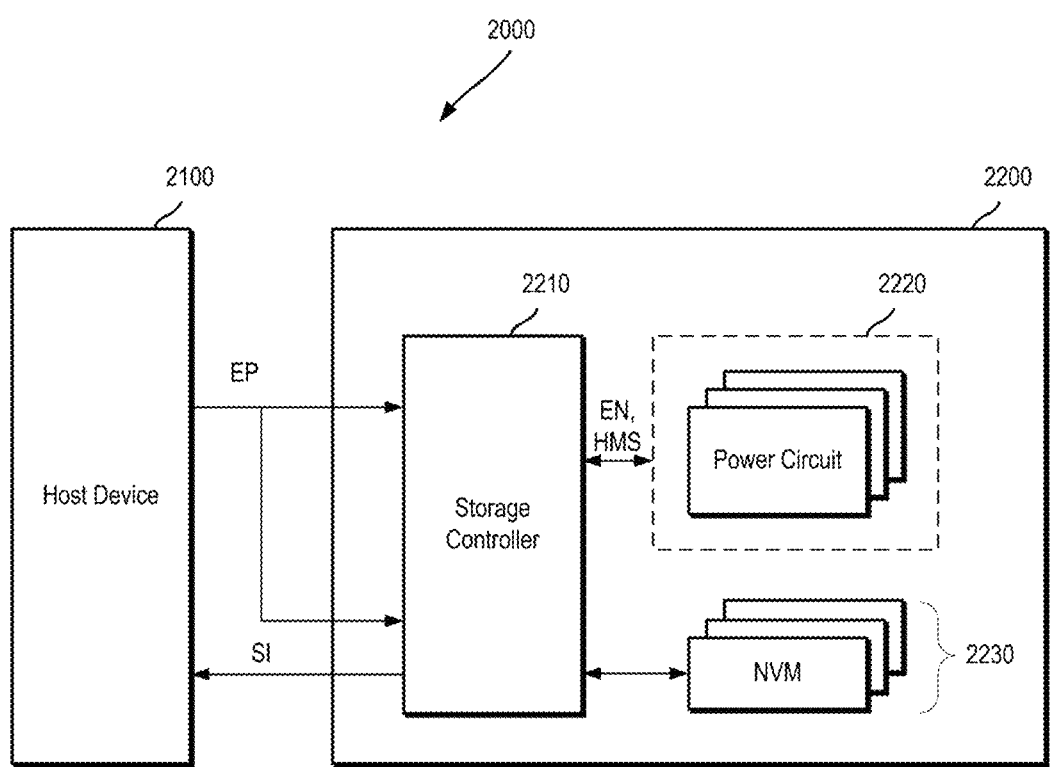
FIG. 12 is a diagram illustrating a storage device according to at least one example embodiment.

FIG. 12 is a diagram illustrating a storage device according to at least one example embodiment.

Referring to FIG. 12, a storage system 2000 according to at least one example embodiment may include at least one host device 2100 and at least one storage device 2200, etc., but the example embodiments are not limited thereto, and the storage system 2000 may include a greater or lesser number of constituent components. The storage device 2200 may include a storage controller 2210, a plurality of power circuits 2220, and/or a nonvolatile memory 2230, etc.

The storage controller 2210 (e.g., processing circuitry, etc.) may be connected to the nonvolatile memory 2230 and may control the overall operation of the storage device 2200 including the plurality of power circuits 2220 and/or the nonvolatile memory 2230, etc. The storage controller 2210 may perform operations according to one or more of the above-described various example embodiments.

In at least one example embodiment, the storage controller 2210 may operate by receiving external power EP from the host device 2100, etc.

In at least one example embodiment, the storage controller 2210 may receive at least one monitoring signal from the plurality of power circuits 2220 to detect hardware initialization failure. When hardware initialization failure is detected in at least one power circuit 2220, the storage controller 2210 may suspend entry into an error mode for the storage device 2200, and may retry hardware initialization for at least one power circuit 2220, etc.

In at least one example embodiment, the storage controller 2210 may control each of the plurality of power circuits 2220 through a plurality of enable signals EN applied to the plurality of power circuits 2220. In at least one example embodiment, the storage controller 2210 may retry hardware initialization for at least one power circuit 2220 based on the enable signal EN, while the number of times of retry is less than a desired threshold number of the number of times to retry.

In at least one example embodiment, the storage controller 2210 may transmit status information SI on the plurality of power circuits 2220 to the host device 2100 even before hardware initialization success has been detected.

The plurality of power circuits 2220 may sequentially operate to drive the storage device 2200 according to one or more of the above-described various example embodiments. The plurality of power circuits 2220 may provide a monitoring signal to the storage controller 2210.

The nonvolatile memory 2230 may be controlled by the storage controller 2210. The nonvolatile memory 2230 may store data transmitted from the host device 2100, data generated by the storage device 2200, and/or other various data written by the storage controller 2210, etc. In at least one example embodiment, the nonvolatile memory 2230 may be any nonvolatile memory 2230, such as a NAND flash memory, a phase change random access memory (PRAM), a resistance random access memory (RRAM), a nano floating gate memory (NFGM), a polymer random access memory (PoRAM), a magnetic random access memory (MRAM), and/or a ferroelectric random access memory (FRAM), but the example embodiments are not limited thereto.

As described above, a storage device providing a hardware initialization retry function, a system including the storage device, and/or a method of operating the storage device may be provided.

While various example embodiments have been shown and described above, it will be apparent to a person of ordinary skill in the art that modifications and variations could be made without departing from the scope of the inventive concepts as defined by the appended claims.

What is claimed is:

1. A storage device comprising:
   a plurality of power circuits configured to operate sequentially to drive the storage device;
   a control circuit configured to,
      monitor a plurality of first monitoring signals received from the plurality of power circuits, and
      generate a retry request in response to detection of hardware initialization failure in at least one of the plurality of power circuits based on the plurality of first monitoring signals; and
   a power sequence circuit configured to,
      monitor a plurality of second monitoring signals received from the plurality of power circuits and the control circuit, and
      retry a hardware initialization operation for at least one power circuit of the plurality of power circuits based on the retry request and the plurality of second monitoring signals.

2. The storage device of claim 1, wherein
   each of the plurality of first monitoring signals and the plurality of second monitoring signals indicates either a first state or a second state, the first state indicating hardware initialization success, and the second state indicating hardware initialization failure.

3. The storage device of claim 2, wherein the power sequence circuit is further configured to:
   discontinue the hardware initialization retry operation in response to each of the plurality of first monitoring signals and the plurality of second monitoring signals indicating the first state.

4. The storage device of claim 1, wherein the power sequence circuit is further configured to:
   control the plurality of power circuits and the control circuit using a plurality of enable signals.

5. The storage device of claim 4, wherein the power sequence circuit is further configured to:
   count a number of hardware initialization operations performed; and
   transmit at least one enable signal of the plurality of enable signals to the at least one power circuit based on the number of hardware initialization operations performed and a desired limit for the number of hardware initialization operations performed.

6. The storage device of claim 1, wherein the power sequence circuit is further configured to:
   perform the hardware initialization retry operation of the plurality of power circuits sequentially starting from a first power circuit of the plurality of power circuits, the first power circuit configured to receive an external power first among the plurality of power circuits.

7. The storage device of claim 1, wherein the power sequence circuit is further configured to:
   detect the hardware initialization failure of at least one power circuit of the plurality of power circuits based on the plurality of second monitoring signals received from the plurality of power circuits before the control circuit is turned on.

8. The storage device of claim 1, wherein the power sequence circuit is further configured to:
   receive first power from a host device; and
   receive second power from at least one power circuit of the plurality of power circuits.

9. The storage device of claim 1, wherein the power sequence circuit is further configured to:

increment a number of hardware initialization operations performed in response to the hardware initialization operation being performed;

transmit a plurality of enable signals to the plurality of power circuits and the control circuit; and transmit status information associated with the plurality of power circuits and the control circuit based on the plurality of second monitoring signals to a host device.

10. The storage device of claim 9, wherein the power sequence circuit is further configured to:

discontinue transmission of the enable signal in response to the number of hardware initialization operations performed being greater than or equal to a desired limit for the number of hardware initialization operations performed.

11. The storage device of claim 9, wherein power sequence circuit is further configured to:

perform the hardware initialization operation by toggling the enable signal for at least one power circuit of the plurality of power circuits and the control circuit.

12. The storage device of claim 9, wherein the power sequence circuit is further configured to:

transmit the status information to the host device before hardware initialization success of the plurality of power circuits is detected.

13. A method of operating a storage device, the method comprising:

monitoring a plurality of first monitoring signals generated by a plurality of power circuits;

generating a retry request in response to detection of hardware initialization failure in at least one power circuit of the plurality of power circuits based on the plurality of first monitoring signals;

receiving a plurality of second monitoring signals generated by the plurality of power circuits and a control circuit; and performing a hardware initialization operation for the at least one power circuit based on the retry request and the plurality of second monitoring signals.

14. The method of claim 13, further comprising:

determining a number of hardware initialization operations performed;

incrementing the number of hardware initialization operations performed in response to the number of hardware initialization operations performed is less than a desired limit; and toggling an enable signal applied to the at least one power circuit.

15. The method of claim 14, wherein the performing the hardware initialization operation is repeatedly performed based on the retry request, the plurality of second monitoring signals, the number of hardware initialization operations performed and the desired limit.

16. The method of claim 13, further comprising:

detecting a first state from the plurality of first monitoring signals and the plurality of second monitoring signals, the first state indicating hardware initialization success; and discontinuing the performing the hardware initialization operation in response to the first state being detected.

17. A storage device comprising:

a nonvolatile memory;

a plurality of power circuits configured to operate sequentially to drive the storage device; and processing circuitry connected to the nonvolatile memory and the plurality of power circuits, the processing circuitry configured to, in response to detecting failure of a hardware initialization operation of at least one power circuit of the plurality of power circuits, suspend entry into an error mode of the storage device, and retry a hardware initialization operation for the at least one power circuit.

18. The storage device of claim 17, wherein the processing circuitry is further configured to control each of the plurality of power circuits based on a plurality of enable signals.

19. The storage device of claim 18, wherein the processing circuitry is further configured to:

initiate a retry the hardware initialization operation for the at least one power circuit using the enable signal; and increment a number of hardware initialization operations performed.

20. The storage device of claim 17, wherein the processing circuitry is further configured to:

transmit status information associated with the plurality of power circuits to a host device before hardware initialization success of the plurality of power circuits has been detected.

* * * * *